United States Patent [19]

Kvant

[11] Patent Number: 4,814,106

[45] Date of Patent: Mar. 21, 1989

[54] MANUFACTURE OF A BASIC METAL HYDROXYSULFATE COMPLEX IN SOLID FORM

[75] Inventor: Magnus Kvant, Lund, Sweden

[73] Assignee: General Chemical Corporation, Parsippany, N.J.

[21] Appl. No.: 37,329

[22] Filed: Apr. 13, 1987

[30] Foreign Application Priority Data

May 27, 1986 [SE] Sweden ................... 8602417

[51] Int. Cl.$^4$ ............... C01F 7/04; C01G 49/14; C02F 5/08
[52] U.S. Cl. ................... 252/363.5; 252/175; 423/556; 423/558; 423/DIG. 12
[58] Field of Search ............... 252/363.5, 175; 423/556, 558, DIG. 12

[56] References Cited

U.S. PATENT DOCUMENTS

| | | |
|---|---|---|
| 2,250,926 | 7/1941 | Clark . |
| 2,354,146 | 7/1944 | Samuel . |
| 3,929,666 | 12/1975 | Aiba et al. . |
| 3,959,133 | 5/1976 | Fulton . |
| 4,051,028 | 9/1977 | Fiessinger . |
| 4,131,545 | 12/1978 | Redmayne et al. . |
| 4,238,347 | 12/1980 | Gancy et al. . |
| 4,284,611 | 8/1981 | Gancy et al. . |
| 4,388,208 | 6/1983 | Gytel . |
| 4,402,851 | 9/1983 | Lindahl ............... 252/363.5 |
| 4,526,772 | 7/1985 | Takada et al. . |
| 4,563,342 | 1/1986 | Gunnarsson et al. . |

FOREIGN PATENT DOCUMENTS

| | | |
|---|---|---|
| 0005419 | 5/1979 | European Pat. Off. . |
| 0017634 | 3/1980 | European Pat. Off. . |
| 0069719 | 6/1982 | European Pat. Off. . |
| 0069718 | 6/1982 | European Pat. Off. . |
| 0110846 | 6/1984 | European Pat. Off. ............ 423/556 |
| 2630768 | 1/1977 | Fed. Rep. of Germany . |
| 2289447 | 10/1975 | France . |
| 52-24187 | 2/1977 | Japan . |
| 52-24188 | 2/1977 | Japan . |
| 52-24189 | 2/1977 | Japan . |
| 53-146297 | 12/1978 | Japan . |
| 54-154927 | 12/1979 | Japan . |
| 7201333 | 2/1972 | Sweden . |
| 7412965 | 10/1974 | Sweden . |
| 7503641 | 3/1975 | Sweden . |
| 442144 | 2/1936 | United Kingdom . |

OTHER PUBLICATIONS

Beck et al., Alien Property Custodian, Ser. No 292,742, Jul. 13, 1943.
Beck et al., Alien Property Custodian, Ser. No. 393,258, Jul. 13, 1943.

Primary Examiner—John F. Terapane
Assistant Examiner—Gary Geist
Attorney, Agent, or Firm—Brumbaugh, Graves, Donohue & Raymond

[57] ABSTRACT

A product containing calcium sulfate hemihydrate and polynucleate basic metal hydroxysulfate complex in solid form provides a positively charged polynucleate complex possessing charge neutralizing properties in systems containing suspended or colloidal negatively charged particles when dissolved in water. Preferred materials contain polyaluminum hydroxysulfate complex and polyferrihydroxysulfate complex, and calcium sulfate hemihydrate. The invention also relates to a method for producing the product by mixing a molten aluminum or iron (III) sulfate and a calcium compound, allowing the mixture to react to form a product, and cooling the product to form a comminutable or grindable solid product.

4 Claims, No Drawings

MANUFACTURE OF A BASIC METAL HYDROXYSULFATE COMPLEX IN SOLID FORM

The present invention relates to a method for producing polynucleate basic trivalent metal hydroxysulfate in solid form which when dissolved in water produces positively charged polynucleate complexes possessing charge neutralizing properties in systems that contain suspended or colloidal negatively charged particles.

The objective of the present invention is to provide a rational method for industrial production of polynucleate, basic aluminum sulfate in solid form.

BACKGROUND OF THE INVENTION

There are known to the art a number of aluminum products which contain polynucleate aluminum ions in solution. These products have been produced in response to the demand for more effective chemicals for use in water purification, paper sizing and plant dewatering processes. The products exhibit considerably improved properties for use within these technical fields, due to the higher electrical charge of the polynucleate metal ions in comparison with the earlier simple compounds.

The aluminum products that have been developed are principally of two kinds: chloride-based basic aluminum compounds, and sulfate-based basic aluminum compounds. With regard to the first group, there was initially developed a polyaluminum chloride (PAC) of the general formula $$[AlCl_x(OH)_{3-x}]_n$$

where x is <3, normally 1-2. Such compounds and methods for their manufacture are described, for example, in SE-B-7201333-7, SE-B-7405237-4, SE-B-7412965-1, SE-B-7503641-8, and DE-A-2630768.

The other type of aluminum chloride solutions (PALC) which are also based on the same polynucleate complexes, have general formulas which can be written as:

$$[AlClhd 3-x\ AOH]_n$$

where A signifies an alkali metal, and

$$[AlCl_3\cdot(x/2B(OH)_2]_n$$

where B signifies an alkali earth metal, n is a positive integer, and x is a number in the range 1 to 2.7. Polynucleate aluminum chloride solutions of the PALC-type are described in FR-A1-7512975, according to which the solutions are prepared by alkalizing aluminum chloride solutions with solutions of alkali hydroxide. According to this reference, however, it has not been possible to produce clear, stable solutions other than in a highly diluted state.

The term "stable solution" means a solution which will not change significantly with regard to its composition and properties, even when stored for long periods of time. It is stated in the FR-A1-7512975 that a solution containing up to 0.40 moles of aluminum per liter can be obtained under certain circumstances. The stability of the solution, however, is greatly limited and the solution must be injected directly into the water to be treated. It is clearly evident from the reference, and in particular from the working examples, that the known PALC solutions which have aluminum concentrations above about 0.1 mole/liter cannot be expected to be effective and stable.

Sulfate-based basic aluminum compounds have been described in EP-A-79850039-3, EP-A-80850033-4 and SEA-8101830-1. These products contain polynucleate metal ions in solution, to a greater or lesser extent, and are thus effective water cleansing agents. The sulfate-based products can also be used for purposes other than for cleansing water in which the presence of polynucleate metal ions favors the effects desired. In certain cases, however, it is highly desirable, and even necessary, to restrict the supply of sulfate ions to the smallest possible amount.

Low sulfate is particularly important when using the product to produce drinking or tap water. Sulfate reduction is also important in the case of systems which are used and cleansed repeatedly in order to eliminate the risk of sulfate accumulations in tissue and in water. This applies to water purifying systems used in areas where there is a water deficiency, necessitating the repeated use of available water for as long as possible, with intermediate cleansing of the water. In water such as this, after cleansing the water ten times with conventional aluminum sulfate, or compositions having corresponding sulfate contents, the sulfate content of the water may reach such high levels as to result in a corrosive attack on the water-carrying conduit systems, resulting in troublesome leakage. The problem of enrichment of sulfate-ions has now also become manifest in the manufacture of paper, where the water transportation system is, to a large extent, completely closed for environmental purposes. The manufacturing processes are seriously affected by excessively high salt concentrations in the paper stock.

U.S. Pat. No. 4,238,347 discloses a method of producing sulfate-lean basic aluminum sulfate of the formula:

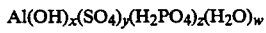
$$Al(OH)_x(SO_4)_y(H_2PO_4)_z(H_2O)_w$$

where
x is 0.75 to 1.5;
y is 0.7 to 1.07;
z is 0 to 0.2 and
w is 2.0 to 4.2, wherein
x+2y+z is equal to 3.

The compounds are prepared by reacting aluminum sulfate with the comminuted calcium carbonate, optionally in the presence of phosphoric acid, and passing the reaction mixture through a filter to isolate the gypsum formed. It has been found, however, that the carbon dioxide leaving the reaction process from the calcium carbonate, together with the gypsum create certain technical problems.

SE-A-8104149-3 describes an improved method for producing sulfate-lean polynucleate aluminum hydroxide complexes of the formula:

$$[Al\ (OH)_x(SO_4)_y(H_2O)_z]_n$$

where
n is an integer;
x is 0.75-2.0;
y is 0.5-1.12;
x +2y is 3;
z is 1.5-4 when the product is in solid form, and
z is >>4 when the product is in solution, wherein aluminum sulfate is reacted with one or more compounds taken from the group CaO, Ca(OH)$_2$, BaO, Ba(OH)$_2$, SrO, Sr(OH)$_2$ in aqueous solution to form the aforesaid compound, whereafter the resultant alkali earth metal sulfate precipitate is isolated and the residual solution optionally evaporated. The resultant solution has excellent properties and can be obtained with a high basicity, OH/Al≦2.0. Manufacture is complicated, however, since isolation of the alkali earth metal sulfate is difficult to achieve and places specific demands on the technical equipment used.

Still a further method of producing these complexes is described in SE-A-8206207-6, in which a solution of an aluminum salt is neutralized to pH 5–7 to precipitate amorphous aluminum hydroxide, which is isolated and thereafter contacted with sulfate-ions in the form of aluminum sulfate and/or sulfuric acid to a "y" value of 0.5–1.12, preferably 0.5–0.75, this product being optionally converted to a solid form.

Another method of producing polynucleate aluminum hydroxide sulfate complexes is described in SE-A-8206206-8. This method comprising cooling a solution containing a polynucleate hydroxide sulfate complex of the formula:

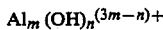

$$Al_m(OH)_n^{(3m-n)+}$$

in which the anion is (SO$_4$) $_{(3m-n)-(3m-n)/2}$ where m and n are integers. These materials are prepared by alkalizing aluminum sulfate with NaOH or Na$_2$CO$_3$, so as to crystallize out Na$_2$SO$_4$·10H$_2$O which is then separated out and the residual solution optionally concentrated or dried to solid form by evaporation.

The conversion of solutions of polynucleate aluminum complexes to a solid form in order to maintain the stability of the complex in those instances when the presence of costly stabilizing agents is not desired, is both complicated and expensive, such that the final product is not truly competitive with standard aluminum sulfate (BOLIDEN® ALG) or aluminum-ferrisulfate (BOLIDEN® AVR), for use in water cleansing processes. Water cleansing processes, drinking water, and domestic sewage purification processes require the presence of large quantities of flocculating agents for precipitating out the impurities present, such as, inter alia, phosphorous, and the cost of the water cleansing chemicals required in sewage purification in particular is very high. Demands have therefore been made for more effective and relatively inexpensive chemicals.

SUMMARY OF THE INVENTION

It has now surprisingly been found possible to eliminate these technical problems in a simple and an efficient manner with the aid of the product according to the present invention, which product contains a sulfate-lean basic metal hydroxysulfate of the general formula:

$$[M(OH)_x(SO_4)_y(H_2O)_z]_n$$

where
n is an integer;
M is a trivalent metal ion
x is 0.75–2.0;
y is 0.5–1.12;
x+2y is 3;
z is 1.5–4 when the product is in a solid form and
z is >>4 when the product has the form of an aqueous solution, and calcium sulfate hemihydrate.

The mole ratio of Ca, expressed as Ca(OH)$_2$, to M, expressed as M$_2$(SO$_4$)$_3$, is at most 2, and the amount of water in the product, expressed as the water of crystallization per mole M$_2$(SO$_4$)$_3$, is at most 6 H$_2$O. The mole ratio of Ca(OH)$_2$ to M$_2$(SO$_4$)$_3$ is suitably 1.0 to 2.0, although preferably 1.5 to 2.0.

The product is also produced in accordance with the invention in a simple and practical manner, the method being characterized by mixing molten metal sulfate such as aluminum sulfate, Al$_2$(SO$_4$)$_3$·14H$_2$O and/or aluminum sulfateferrisulfate, Al$_2$(SO$_4$)$_3$·14H$_2$O; Fe$_2$(SO$_4$)$_3$·9H$_2$O, with a calcium compound selected from the group Ca(OH)$_2$, CaO, CaCO$_3$, CaMg(CO$_3$)$_2$; optionally removing water from the mixture; and cooling the mixture to obtain a comminutable or grindable, solid product containing polyaluminum hydroxide sulfate complex and optionally polyferrihydroxy sulfate complex and calcium sulfate hemihydrate.

DETAILED DESCRIPTION OF THE INVENTION

Solid compositions according to the invention are mixtures of calcium sulfate hemihydrate with a metal hydroxysulfate complex of the general formula:

$$[M(OH)_x(SO_4)_y(H_2O)_z]_n$$

wherein
M is a trivalent metal ion;
n is an integer;
x is 0.75 to 2.0;
y is 0.5 to 1.12; and
z is 1.5 to 4.

Particularly preferred solid compositions are those in which
x is 1.1–1.8.;
y is 0.6 to 0.7; and
z is 2.0 to 2.5.

The compound exists in the form of a polynucleate complex in aqueous solution and has the same form when solid.

For use as a water treatment chemical, the solid product of the invention will generally be redissolved in water. The solid product obtained in accordance with the invention dissolves relatively quickly in water (<2 minutes), even when ground or comminuted to a relatively coarse particle size. The gypsum (calcim sulfate hemihydrate) present is suspended in the resultant solution, while the metal hydroxysulfate complex is dissolved therein. The water cleansing properties of such a suspension have been found to be far superior to those of conventional aluminum sulfate products (BOLIDEN® ALG, AVR). The reason why the respective constituents of the product rapidly suspend and dissolve in a water phase is probably due to the fact that the gypsum present, which has a hemihydrate form in the solid product is rearranged to a dihydrate, therewith causing an increase in volume and temperature such as to accelerate the dissolution reaction.

The present invention will now be described in more detail with reference to a number of working examples.

EXAMPLE 1

A product having a basicity (OH/M) of 1.7 was prepared from 100 g of molten aluminum sulfate-ferrisulfate (BOLIDEN® AVR, Al$_2$(SO$_4$)$_3$·14H$_2$O; Fe$_2$(SO$_4$)$_3$·9H$_2$O, 7% Al, 3% Fe). The temperature of the melt was 115° C. and the melt was held at this temperature while mixing 15.0 g CaO with the melt over a period of 2 minutes. The resultant reaction mixture was then cooled to room temperature, and the molten product gradually transformed into a solid, comminutable product.

The final product was analyzed and found to contain water in an amount corresponding to 6 $H_2O$ per mole (Al, Fe)$_2$ (SO$_4$)$_3$. The polynucleate aluminum sulfate-ferrisulfate complex present in the product contains 1.7 OH per mole M (Al, Fe). The product contained Ca-SO$_4 \cdot \frac{1}{2} H_2O$, calcium sulfate hemihydrate.

EXAMPLE 2

100 g Al$_2$(SO$_4$)$_3 \cdot 14 H_2O$ having a temperature of 115° C. were admixed with 15.5 g CaO, in accordance with the procedure of Example 1 to yield an end product having an OH/Al ratio of 1.65 in the resultant polyaluminum hydroxysulfate complex.

If calcium hydroxide is used in place of CaO, it is necessary to evaporate off larger quantities of water, in order to obtain a comminutable product. This can be affected by maintaining the product at an elevated temperature for some few minutes prior to cooling the product to room temperature, or by reacting the product in a vessel of large surface area so as to rapidly evaporate the water present.

It should be noted that it has not been possible previously to prepare polymetal hydroxy complexes at temperatures higher than 70° C. when practicing the known methods, due to decomposition of the complex at said higher temperatures. It is therefore particularly surprising that the claimed product can be produced successfully by means of the method according to the present invention.

It has been found that with a dry solids content of 69% or above of M$_2$SO$_4$)$_3 \cdot x H_2O$ measured by expelling water in a conventional domestic microwave oven for five minutes at maximum power, it is not necessary to expel water during the reaction between M$_2$(SO$_4$)$_3$ and CaO.

In order to obtain a comminutable or grindable product, the M$_2$O$_3$ content of the polymetal hydroxy complex of the end product is preferably in excess of 14% by volume, the calcium sulfate being precipitated out as hemihydrate. This means that the crystallization water present per mole of ingoing Al$_2$(SO$_4$)$_3$ or (Al,Fe)$_2$(SO$_4$)$_3$, about 14 $H_2O$, is reduced to 6 $H_2O$ in the end product.

A product according to Example 1 (PAV) above was tested with regard to its ability to clarify turbid sewage water. The test also included a comparison test using standard aluminum sulfate-ferrisulfate (AVR). The starting turbidity was >100 FTU. As will be seen from the following table, the product according to the present invention gave a far better result than the standard product.

TABLE

| Dosage mmole/l Metal | Turbidity FTU | |
|---|---|---|
| | PAV | AVR |
| 140 | 3.5 | 35 |
| 160 | 3.5 | 35 |
| 180 | 3.0 | 35 |
| 200 | 3.0 | 37 |
| 220 | 3.0 | 38 |
| 240 | 4.0 | 42 |
| 260 | 5.0 | 47 |
| 280 | 5.0 | 51 |

As shown in the Table, the product according to the invention exhibits a highly linear, flat register and overdosing does not increase the turbidity in any way.

I claim:

1. A method for producing a polynucleate basic metal hydroxysulfate product in solid form which when dissolved in water will provide a positively charged polynucleate complex possessing charge neutralizing properties in systems containing suspended or colloidal negatively charged particles comprising, mixing a molten aluminum or iron (III) sulfate and a calcium compound taken from the group consisting of Ca(OH)$_2$, CaO, CaCO$_3$ and CaMg(CO$_3$)$_2$ and allowing the mixture to react to form a product; and cooling the product to ambient temperature to form a comminutable or grindable solid product containing polymetal hydroxysulfate complex and calcium sulfate hemihydrate.

2. A method according to claim 1, wherein the melt has a temperature of 100° C. to 115° C.

3. A method according to claim 1, wherein the dry solids content of the molten aluminum or iron(III) sulfate present is at least 69%, determined by heating the product in a conventional microwave oven for five minutes at maximum power output.

4. A method according to claim 1, wherein the polynucleate basic metal hydroxysulfate produced has the formula $$[M(OH)_{hd x}(SO_4)_y(H_2O)_z]_n$$

where
M is a trivalent metal ion;
n is an integer;
x is 0.75 to 2.0;
x + 2y is 3; and
z is 1.5 to 4.

* * * * *

UNITED STATES PATENT AND TRADEMARK OFFICE
CERTIFICATE OF CORRECTION

PATENT NO. : 4,814,106

DATED : March 21, 1989

INVENTOR(S) : Kvant

It is certified that error appears in the above-identified patent and that said Letters Patent is hereby corrected as shown below:

Col. 1, line 43, that portion of the formula reading "[AlClhd 3·x" should read --[AlCl$_3$ · x--;

Col. 3, line 22, "comprising" should be --comprises--;

Col. 4, line 37, "1.1-18." should read --1.1-1.8--;

Col. 4, line 48, "calcim" should read --calcium--; and

Col. 6, line 45, that portion of the formula reading "[M(OH)hd x" should read --[M(OH)$_x$--.

Signed and Sealed this

Twenty-first Day of November, 1989

Attest:

JEFFREY M. SAMUELS

Attesting Officer    Acting Commissioner of Patents and Trademarks